United States Patent [19]

Hasegawa

[11] Patent Number: 5,164,025
[45] Date of Patent: Nov. 17, 1992

[54] SOFT MAGNETIC ALLOY FILM AND A MAGNETIC HEAD USING SUCH SOFT A MAGNETIC ALLOY FILM

[75] Inventor: Naoya Hasegawa, Yunotani, Japan

[73] Assignee: Alps Electric Co., Ltd., Tokyo, Japan

[21] Appl. No.: 847,435

[22] Filed: Mar. 6, 1992

Related U.S. Application Data

[63] Continuation of Ser. No. 430,842, Nov. 2, 1989, abandoned.

[30] Foreign Application Priority Data

Nov. 2, 1988 [JP] Japan .................................. 63-278302
Nov. 2, 1988 [JP] Japan .................................. 63-278303
Mar. 8, 1989 [JP] Japan .................................. 1-55571

[51] Int. Cl.$^5$ .............................................. H01F 1/04
[52] U.S. Cl. .................................. 148/313; 148/315; 420/435
[58] Field of Search ................. 148/305, 313; 420/435

[56] References Cited

U.S. PATENT DOCUMENTS 3,415,643 12/1968 Freche et al. ..................... 148/313
4,557,769 12/1985 Shimada et al. .................. 148/403

FOREIGN PATENT DOCUMENTS 60-15808 1/1985 Japan .................................. 148/305
60-116742 6/1985 Japan .................................. 148/305
2147608 5/1985 United Kingdom ............... 148/305

Primary Examiner—John P. Sheehan
Attorney, Agent, or Firm—Guy W. Shoup; B. Noel Kivlin

[57] ABSTRACT

There is provided a soft magnetic alloy having a composition expressed by formula $Co_xM_zC_w$, wherein M represents one or more than one of the metal elements including Ti, Zr, Hf, Nb, Ta, Mo, V and W, and x, w and z represent the ratios in terms of atom % of the respective elements in the overall composition satisfying $$55 \leq x \leq 96,$$

$$2 \leq x \leq 25,$$

$$0.1 \leq x \leq 20 \text{ and}$$

$$x+z+w=100$$

and metallurgically consisting of crystalline particles with an average diameter of less than 0.05 μm. The alloy partially contains carbide(s) of element(s) M in the crystal phase. A magnetic head comprising such a soft magnetic alloy film shows an excellent saturated flux density that can accommodate the requirement of high recording density and other requirements.

2 Claims, 6 Drawing Sheets

SOFT MAGNETIC ALLOY FILM AND A MAGNETIC HEAD USING SUCH SOFT A MAGNETIC ALLOY FILM

This application is a continuation of application Ser. No. 07/430,842, filed Nov. 2, 1989, abandoned.

BACKGROUND OF THE INVENTION

1. Field of the Invention

This invention relates to a soft magnetic alloy film to be suitably used for a magnetic head and it also relates to a magnetic head using such a soft magnetic alloy film for use in a magnetic recording apparatus such as a video cassette recorder.

2. Description of the Prior Art

In the field of magnetic recording technology, efforts have been made to enhance the coercive force of recording media such as magnetic tapes with a view towards improving the density of recording on the media. Such improvement requires developement of materials having a high saturated flux density (Bs) to be used as magnetic heads.

While Fe-Si-Al alloy (Sendust) has been popularly used as a soft magnetic material (film) having a high saturated flux density, noncrystal alloy films containing Cobalt (Co), a ferromagnetic metal, as a major ingredient have been developed in recent years.

More recently, films having a high saturated flux density and excellent soft magnetic characteristics have been developed by using finely crystallized alloys such as Fe-C and Fe-Si alloys to reduce the influence of the crystalline magnetic anisotropy of iron that can deteriorate the soft magnetism of the films.

A magnetic head of this type is required to have magnetic characteristics that can accommodate the high recording density of the magnetic recording medium as well as mechanical properties such as abrasion-resistivity and moldability.

An example of the magnetic heads that have been developed recently to meet these requirements is a composite type magnetic head (or a MIG head) produced by coating the surface of a ferrite substrate, a popular component of a magnetic head, with a soft magnetic material having a saturated flux density which is greater than that of the ferrite.

A composite type magnetic head normally has a configuration comprising a soft magnetic film as well as a gap between a pair of magnetic core halves made of ferrite and the components are bonded together by glass bonding.

In recent years, there has been a remarkable trend in the industry towards reducing the size and weight of electronic apparatus such as magnetic tape decks comprising magnetic heads, although the apparatus are often used under unfavorable conditions including vibration during transport. Thus, a magnetic head is required to have not only excellent magnetic characteristics and a high abrasion-resistivity but also outstanding durability in unfavorable environments where high temperature and corrosive atmosphere as well as vibration are dominant. To realize such durability, it is necessary to use a glass bonding technique for forming the gap and mounting the head into the casing. Consequently, the materials of the magnetic head and film are required to withstand the high temperature prevalent during the head manufacturing process.

Conventional soft magnetic alloy films which are made of Sendust normally have a saturated flux density of approximately 10,000G (Gauss), a value which is far from satisfactory for the current high density requirement. While amorphous alloy films that contain cobalt can have a high saturated flux density of more than 13,000G, any attempt to form an alloy with a high saturated flux density inevitably necessitates reduced levels of amorphousness inducing elements such as Ti, Zr, Hf, Nb, Ta, Mo, V and W, which in turn adversely affects the stability of the amorphous structure of the alloy to such an extent that it does not withstand the high temperatures (approximately 500° C. or above) involved in glass bonding.

In an alloy film that contains fine crystals and is principally made of iron, such as an Fe-C or Fe-Si alloy film, the crystals can grow at high temperatures and deteriorate the film's soft magnetic characteristics, and therefore the film is not suitable for glass bonding.

When a magnetic head is produced using a conventional Co-Ta-Hf or other Co-M type noncrystalline soft magnetic film (wherein M represents one or more than one of the elements including Ti, Zr, Hf, Nb, Ta, Mo, V and W), the process of glass-bonding can give rise to a diffusive reaction involving oxygen on the interface of the core halves and the soft magnetic film, leading to degraded magnetic characteristics at the interfacial area of the product. More specifically, since M (such as Ta and Hf) contained in the soft magnetic film has a strong affinity for oxygen, some of the oxygen atoms contained in the ferrite of the magnetic core halves diffuse and cause changes in the composition of the ferrite due to a deficiency of oxygen and, accordingly, degradation of magnetic characteristics. A magnetically degraded area along the soft magnetic film eventually comes to form pseudo-gaps which contributes to degradation of the performance of the magnetic head, including an increased level of noise generation.

SUMMARY OF THE INVENTION

It is an object of the present invention to provide a soft magnetic alloy film having a small coercive force, a high magnetic permeability, heat-resistive magnetic characteristics and a high saturated flux density.

Another object of the present invention is to provide a magnetic head that can effectively prevent diffusion of oxygen during glass bonding in order to suppress formation of pseudo-gaps and, consequently, reduce the noise level by avoiding generation of noise due to pseudo-gaps.

The invention comprises a soft magnetic alloy film which principally consists of Co and an amount of additive elements which are limited to a very low level in order to avoid any reduction of the saturated flux density. The product normally has a high saturated flux density, up to 16,000G. The fact that elements M (including Ti, Zr, Hf, Nb, Ta, Mo, V and W) as well as C are added, and that the product consists of fine crystalline particles, contributes to significant reduction of the adverse affect of the crystal magnetic anisotropy on the soft magnetism, and hence promises good soft magnetic characteristics of the product. Moreover, deposition of carbides of elements M supress the growth of crystalline particles containing Co as the principle ingredient, even when the film is heated to 600° C. or above during the glass bonding process.

BRIEF DESCRIPTION OF THE DRAWINGS

FIGS. 5 and 6 illustrate an embodiment of the magnetic head according to the invention in which FIG. 5 is an enlarged partial view of the embodiment and FIG. 6 is a perspective view.

DETAILED DESCRIPTION OF THE INVENTION

Figure 1:
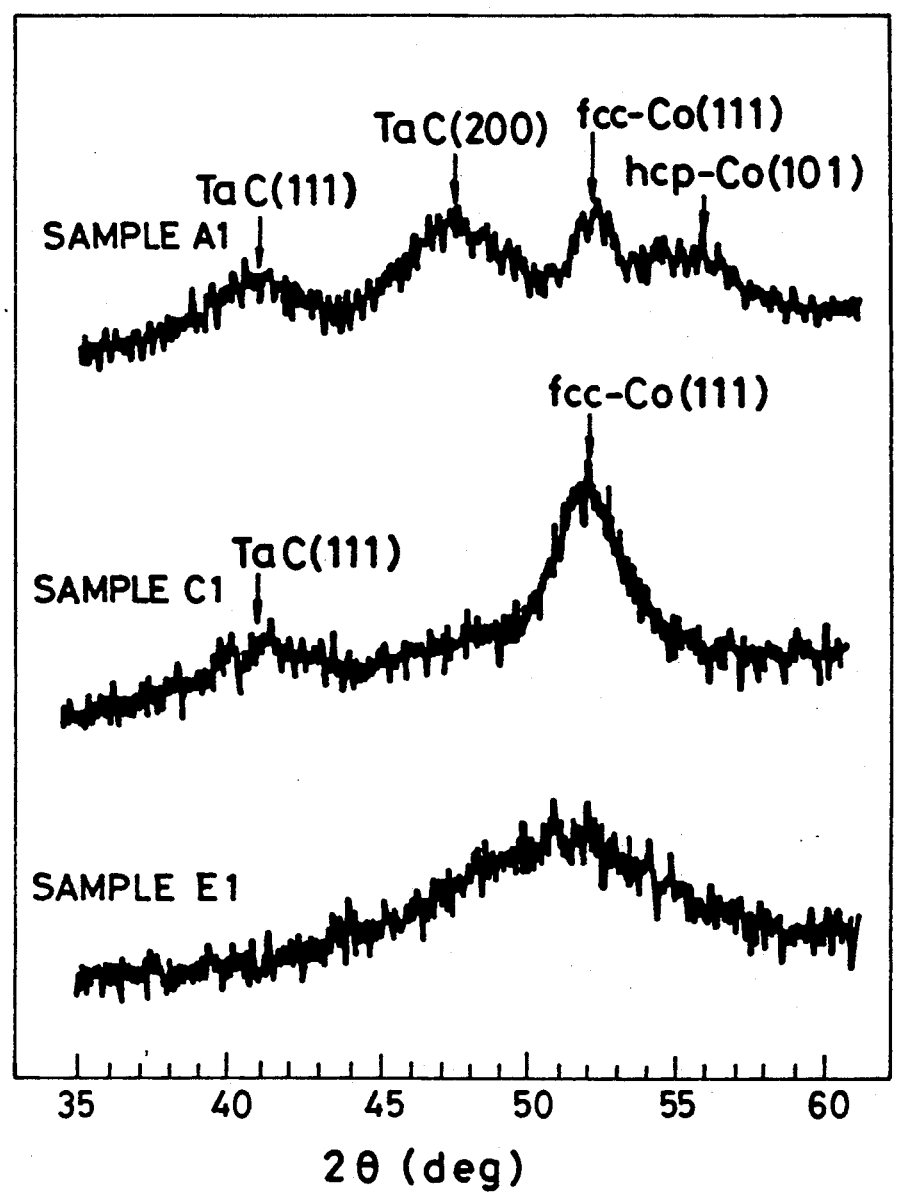
FIG. 1 is a graphic illustration of the X-ray diffraction patterns collected for identifying the metallurgic compositions of films prepared according to the first and third embodiments, and of the control.

The above and other problems present in the prior art can be solved by the first through forth embodiments of this invention. The first embodiment provides a soft magnetic alloy film having a composition expressed by the formula $Co_xM_zC_w$, wherein M represents one or more of the metal elements including Ti, Zr, Hf, Mb, Ta, Mo, V and W, and x, w, and z represent ratios of the respective elements in terms of atom percent and the overall composition satisfying the equations:

$55 \leq x \leq 96$, $2 \leq z \leq 25$, $0.1 \leq w \leq 25$ and, $x + z + w = 100$.

The alloy film metallurgically consists of crystalline particles with an average diameter of less than 0.05 μm micrometers, partially contains carbides of elements M in the crystal phase, and employs a crystalline texture.

In the second embodiment, the soft magnetic alloy film described above with regard to the first embodiment metallurgically comprises principally crystalline particles with an average diameter of less than 0.05 μm and a noncrystal, amorphous texture.

The third embodiment provides a soft magnetic alloy film having a composition expressed by the formula $Co_xT_yM_zC_w$, wherein T represents one or more of the metal elements including Fe, Ni and Mn, while M represents one or more of the metal elements including Ti, Zr, Hf, Nb, Ta, Mo, V and W, and x, y, z and w represent ratios of the respective elements in terms of atom percent in the overall composition satisfying the equations:

$50 \leq x \leq 96$, $0.1 \leq y \leq 20$, $2 \leq z \leq 25$, $0.1 \leq w \leq 25$, and ti $x + y + z + w = 100$.

The alloy film metallurgically consists of crystalline particles with an average diameter of less than 0.05 μm, partially contains carbides of elements M in the crystal phase, and employs a crystalline texture.

In the fourth embodiment a soft magnetic alloy film as described above with regard to the third embodiment metallurgically comprises principally crystalline particles with an average diameter of less than 0.05 μm and a noncrystal, amorphous texture.

For preparation of an alloy film according to this invention, the sputtering or vapor deposition technique may be used in a film forming apparatus. For sputtering, any known sputtering apparatus such as RF bipolar, DC, magnetron, tripolar, ion beam or opposed target sputtering apparatus may be used. For adding carbon to a film, a method of forming a complex target by arranging a number of graphite pellets on a target plate and sputtering the target may be used, or a reactive sputtering method using a target plate (Co-T-M system) containing no carbon and sputtering it in an atmosphere containing a mixture of Ar or other inactive gas and methane ($CH_4$) or other hydrocarbon gas may also be adequately used. The reactive sputtering method has the advantage of producing a film with any desired carbon concentration, as it affords easy control of the carbon concentration within the sputtering chamber.

A film produced in this manner contains an amorphous phase and to a considerable extent, therefore, is unstable. Fine crystalline particles may be formed for stabilizing the film and improving its soft magnetic characteristics by heat treating it at temperatures between 400°–700° C., preferably in a static or rotary magnetic field. The heat treatment may be conducted simultaneously with the glass melt-bonding process for preparation of a magnetic head.

The formation of fine crystalline particles does not necessarily need to be carried out completely. Rather, the formation is sufficient when it has proceeded to a considerable extent, preferably more than 50%, regardless whether any amorphous fractions remain, since they do not constitute any obstacle to betterment of the characteristics of the product.

The above-mentioned ingredients are selected on the following grounds. Co, which is the principle ingredient of the product, is responsible for bringing forth the magnetism of the product and hence $x \geq 55\%$ is a prerequisite for obtaining a saturated flux density equal to or more than that of ferrite (Bs=5,000G). However, it should be noted that in the third and forth embodiments $x \geq 50\%$ is permissible because element T also contributes to attainment of the required magnetism. The Co percentage $x \leq 96\%$ is necessary to provide good soft magnetic characteristics. However, when the soft magnetic alloy film contains only element V as the M substituent in the first embodiment, the range of the Co content is preferably narrowed to $x \leq 93\%$ for good soft magnetic characteristics. On the other hand, when another element M is present with V, $x \leq 96\%$ is sufficient.

Element M (Ti, Zr, Hf, Nb, Ta, Mo, V and W) is required for good soft magnetic characteristics of the product and contributes to formation of fine carbide crystals when used in combination with C. The percentage $z \geq 2\%$ is required to maintain good soft magnetic characteristics for the first through forth embodiments, although the saturated flux density of the product can be reduced when the value of z is too high. Thus, $z \leq 25\%$ is required.

An alloy film containing element V as the only substituent M cannot produce fine VC crystalline particles after heat treatment when the V content is too small. Therefore, $5\% \leq z$ is preferable in this case.

Carbon is indispensable for bringing forth good soft magnetic characteristics as well as good heat-resistance. It also contributes to formation of fine crystals of carbides when used in combination with element M. The fine crystalline particles of MC in the soft magnetic films act as so many pinning sites of the magnetic wall to improve the high frequency characteristics of the magnetic permeability. At the same time, since the particles of MC are evenly distributed throughout the whole film, they effectively prevent growth of the fine crystals of Co during heat treatment. Growth of Co crystals allows adverse effects of crystal magnetic anisotropy to be intensified, leading to deterioration of the soft magnetism of the magnetic film. In other words, the fine crystalline particles of MC act as barriers against undesired growth of fine Co crystals. Because the metal texture of the film predominately consists of fine crystals, it is more thermally stable than a noncrystalline texture, allowing reduction of the amount of additive elements and consequently improving the level of saturated flux density. While $w \geq 0.1$ atom percent is required to ensure soft magnetism and thermal stability, $w \leq 25$ atom percent should be observed to avoid any undesirable deterioration of the saturated flux density of the product.

Elements T (Fe, Ni, and Mn) are added principally for adjustment of the magnetostriction of the product. While a film having the composition $Co_xM_zC_w$ has a negative value magnetostriction around $-10^{-6}$ and therefore is feasible for actual applications, the magnetostriction of a soft magnetic film is most preferably very close to null with a view towards minimizing the deterioration of magnetic characteristics due to any distortion that can be caused thermally by glass bonding and mechanically by machining the magnetic head. Addition of Fe and Mn which has the effect of modifying the magnetostriction to a positive value is therefore effective, although care should be taken to limit the amount of the additive elements such that the value of magnetostriction does not exceed $+10^{-5}$ and $y \leq 20$ atom percent is observed in order to not damage the soft magnetism of the product. Ni has the effect of modifying the value of magnetostriction towards the negative. Therefore, by using Ni in combination with Fe and Mn the magnetostriction of the film can be appropriately controlled.

In addition, Fe and Ni have the effect of stabilizing the crystal structure of Co in the fcc (face-centered cubic lattice) mode, which is magnetically superior to the other mode of Co crystal packing, the hcp (hexagonal closest packing) mode, and has a small crystal magnetic anisotropy, properties desirable for a soft magnetic alloy film.

A magnetic head according to this invention comprises a soft magnetic alloy film with one of its sides placed close to the magnetic core halves of the magnetic head, the film side having the composition $Co_xM_zC_w$, as described for the first and second embodiments. The other side of the film is placed towards the gap of the magnetic head, the film side having the composition $Co_xM_z$, wherein M represents one or more of the metal elements described above and x and z represent ratios of the respective elements in terms of atom percent in the overall composition, and metallurgically consisting of a noncrystal texture. The value of x in $Co_xM_z$ need not be restricted but in general 60 to 90 atom % Co is used.

Alternatively, the soft magnetic alloy film may exclusively (on both sides) have the composition $Co_xM_yC_w$ described for the first and second embodiments.

Preferably, a magnetic head according to this invention comprises a soft magnetic alloy film with one of its sides placed close to the magnetic core halves of the magnetic head and the film side having the composition $Co_xT_yM_zC_w$, described for the third and fourth embodiments. The other side of the film is placed close to the gap of the magnetic head, the film side having the composition $Co_xM_z$, wherein M represents one or more of the metal elements described above and x, z represent ratios of the respective elements in terms of atom percent in the overall composition, and metallurgically consisting of a noncrystal structure.

Alternatively, the soft magnetic alloy film may exclusively (on both sides) have the composition $Co_xT_yM_zC_w$ as described in the third and fourth embodiments.

Since element M (Ta, Hf, etc.) exists as a carbide (TaC, HfC, etc.) within the fine crystalline structure of $Co_xM_zC_w$ and $Co_xT_yM_zC_w$ of a magnetic film according to the invention, and the average diameter of the crystalline particles is less than 0.05 μm, the affinity between the magnetic film and oxygen is significantly reduced. Consequently, permeation of oxygen from the sides of the magnetic core halves to that of the soft magnetic film is blocked, thereby almost completely supressing the formation of pseudo-gaps.

Soft Magnetic Film Example 1

(1) Preparation of Films

Figure 2:
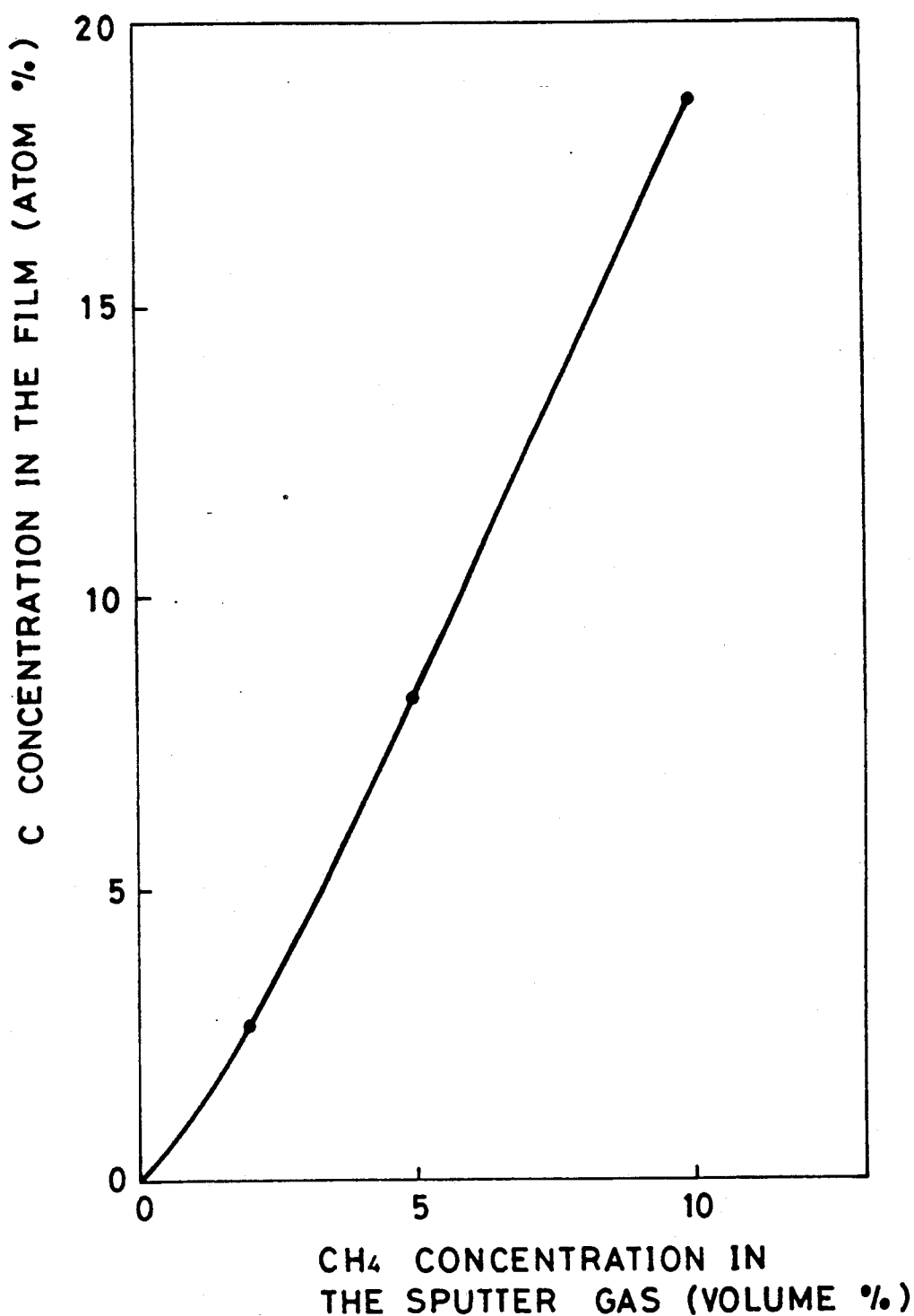
FIG. 2 is a graphic illustration showing the relationship between the $CH_4$ concentration in the sputtering gas and the carbon concentration in the formed film.

Using a RF bipolar sputtering apparatus, alloy films having the composition shown in table 1 were prepared. A target alloy having the composition $Co_{84}Ta_{10}Hf_6$ was used for sample $A_1$ and a target alloy having the composition $Co_{84}Ta_{10}Hf_6$ with pellets of Fe arranged on the target was used for sample $B_1$. A certain amount of carbon was evenly distributed within the films by conducting a sputtering process in an atmosphere containing a mixture of Ar gas and $CH_4$ gas. FIG. 2 shows the relationship between the $CH_4$ concentration (volume percent) in the sputter gas and the carbon concentration (atom percent) in the produced films. The thickness of the obtained films was 5 μm. The final compositions of samples $A_1$ and $B_1$ are shown in Table 1.

(2) Heat Treatment

After preparation of the films, they were subjected to a heat treatment process at 550° C. in a rotating magnetic field for 20 minutes.

(3) Measurement

The alloy film samples as described above and a Sendust alloy film (control) prepared by sputtering were tested for saturated flux density (Bs), magnetic permeability (μ) and coercive force (Hc) as well for magnetostriction. The results of the measurements are shown in Table 1.

Although sample $A_1$ does not contain element T (Fe, Mn, or Ni), it is apparent from Table 1 that it has a magnetic permeability as high as a Sendust film as well as a saturated flux density higher than, and a coercive force lower than those of a Sendust film. Any known amorphous films having a saturated flux density as high as this sample would have easily crystallized during heat treatment under similar conditions, thereby reducing their magnetic permeabilities to 100 or less, which leads to degradation of magnetic characteristics after glass bonding and hence to the production of magnetic heads with poor characteristics.

As seen from Table 1, the alloy film of sample $B_1$ contains Fe to reduce its magnetostriction and it has an enhanced saturated flux density and a reduced coercive force.

Sample $C_1$, whose composition is shown in of Table 1, has a higher Co content as well as a higher Fe content than sample $B_1$, and its saturated flux density is as high as 15,600G. To produce $C_1$ a sputtering process was conducted in an atmosphere of Ar and $CH_4$ using a target of Ta and Fe arranged on a pure Co target.

The X-ray diffraction patterns of the samples were obtained to determined their metallurgical compositions. FIG. 1 illustrates the X-ray diffraction pattern of $A_1$ and that of sample $C_1$ after heat treatment, as well as the diffraction pattern of an amorphous film sample $E_1$ for comparison. Sample $E_1$ has the composition $Co_{84}Ta_{10}Hf_6$ and has been heat treated at 520° C. for 20 minutes.

The diffraction pattern of sample $A_1$ shows broad peaks, suggesting the existence of Co having both the fcc structure (face-centered cubic lattice) and the hcp structure (hexagonal closest packing) as well as TaC crystals. Its crystalline structure is clearly identifiable when the diffraction pattern of $A_1$ is compared with the diffraction pattern of the amorphous film of sample $E_1$. The metallurgical texture of the alloy film of sample $A_1$ is in a partially crystallized state. The peak widths at half height from FIG. 1 were used to calculate particle sizes. It was found that the diameter of the crystalline particles of fcc-Co ranges from 30–40Å, while the diameter of the TaC crystalline particles is around 20Å, indicating that they are very fine particles. Sample $C_1$ contains Fe and therefore shows no hcp-Co peak in FIG. 1, the peak of the diffraction pattern being mostly attributable to fcc-Co. This fact supports the results tabulated in Table 1.

The samples $A_1$ and $C_1$ described above almost totally consist of fine crystalline particles, but in an experiment in which samples were subjected to heat treatment at a lower temperature in order to increase the amorphous phase while still keeping it at less than 50%, samples of identical composition to $A_1$ and $C_1$ also showed considerably good magnetic characteristics.

Figure 3:
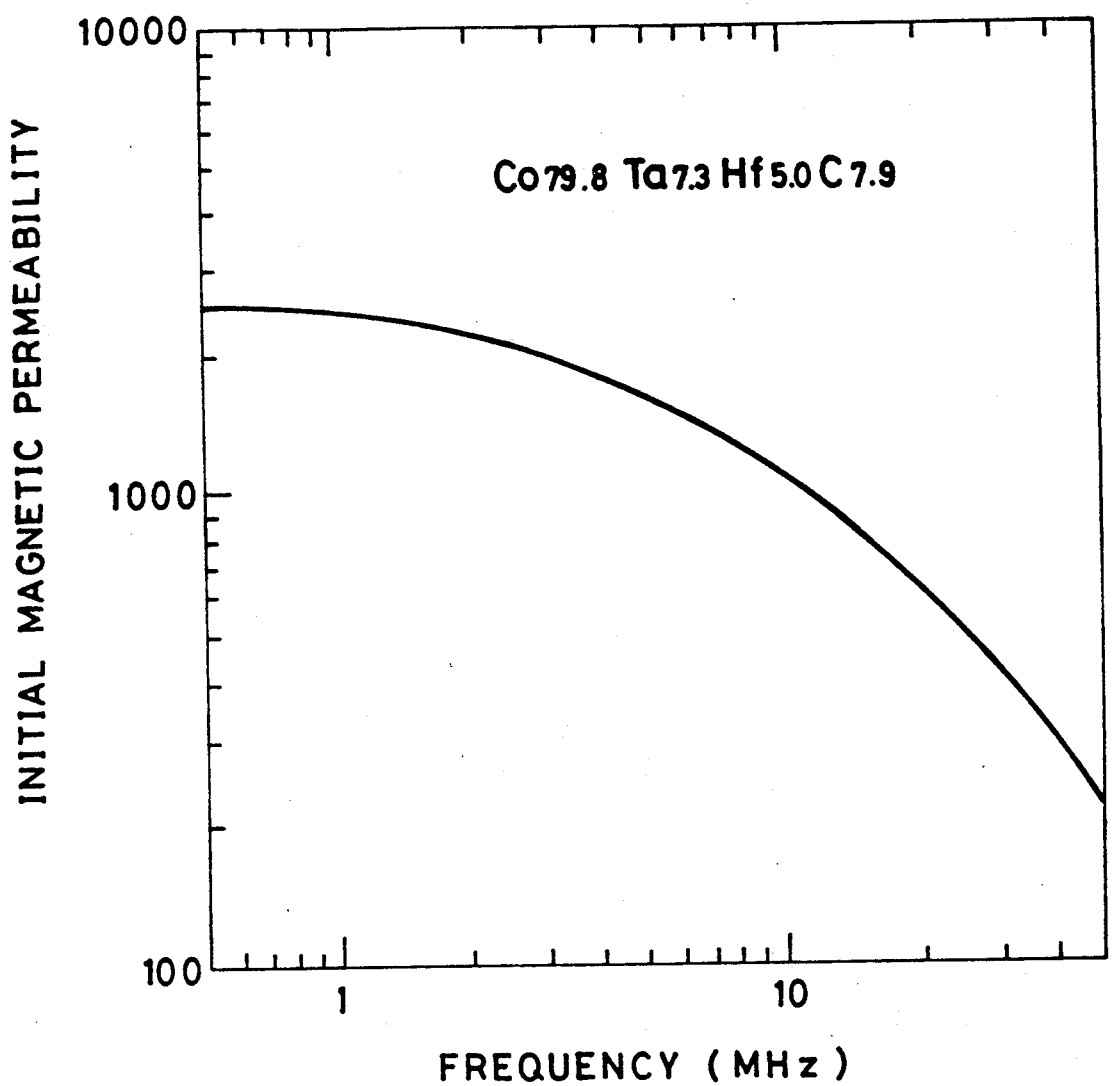
FIG. 3 is a graphic illustration showing the frequency characteristics relative to the initial magnetic permeability of the third embodiment of the invention.

A sample having the same composition as that of sample $A_1$ and a thickness of 5μm was also prepared and subjected to heat treatment at 570° C. in a rotating magnetic field. The sample was tested for frequency characteristics of the magnetic permeability. The result of the test is shown in FIG. 3. In spite of the large, 5μm, thickness of the sample, it showed a high magnetic permeability of greater than 1000 for frequencies up to 10 MHz, indicating the sample's good soft magnetic characteristics.

Soft Magnetic Film Example 2

(1) Preparation of the Films

Using a RF bipolar sputtering apparatus, alloy films having the composition shown in Table 2 were prepared.

A composite target comprising Co targets on which the appropriate pellets of V, Nb, and Fe had been arranged was used for preparation of samples. Sample films having a thickness of 5–6 μm were formed on the composite target by conducting a sputtering process in an atmosphere containing a mixture of Ar and $CH_4$ gas.

(2) Heat Treatment

After formation or the films, they were subjected to heat treatment at 550° C. for 20 minutes in a rotating magnetic filed.

(3) Measurement

The alloy film samples as described above and a Sendust alloy film (control) prepared by sputtering were tested for saturated flux density (Bs), magnetic permeability (μ) and coercive force (Hc) as well as for magnetostriction. The results of the measurements are shown in Table 2.

As seen from Table 2, sample $A_2$ shows a saturated flux density (13,500G) much higher than that of the Sendust film sample. It should be noted that any known amorphous alloy film having a saturated flux density as high as 13,000G would have easily crystallized during heat treatment under similar conditions, thereby reducing its magnetic permeability to below 100 leading to degradation of magnetic characteristics after glass bonding and hence to production of magnetic heads with unsatisfactory characteristics. On the contrary, the alloy film of sample $A_2$ is apparently an excellent film, as it shows a high saturated flux density after heat treatment at high temperatures. While the magnetic permeability and the coercive force of sample $A_2$ were lower than those of the Sendust alloy film, samples $B_2$ and $C_2$ are excellent in this respect.

The alloy film of sample $B_2$ in Table 2 contains Nb, which contributes to retainment of a high saturated flux density after heat treatment as well as to a magnetic permeability and a coercive force which are as high as those of the Sendust alloy film. The alloy film of sample $C_2$ in Table 2 contains additives Nb and Fe, which contribute to retainment of a high saturated flux density after heat treatment as well as to a high magnetic permeability and a high coercive force. The addition of Fe also contributes towards reducing the magnetostriction constant of the alloy to as low as $10^{-7}$.

The X-ray diffraction patterns of the samples were obtained to determine their metallurgical compositions. X-ray diffraction patterns (1) and (2) in FIG. 4 are those of sample $A_2$ before and after heat treatment, respectively.

Figure 4:
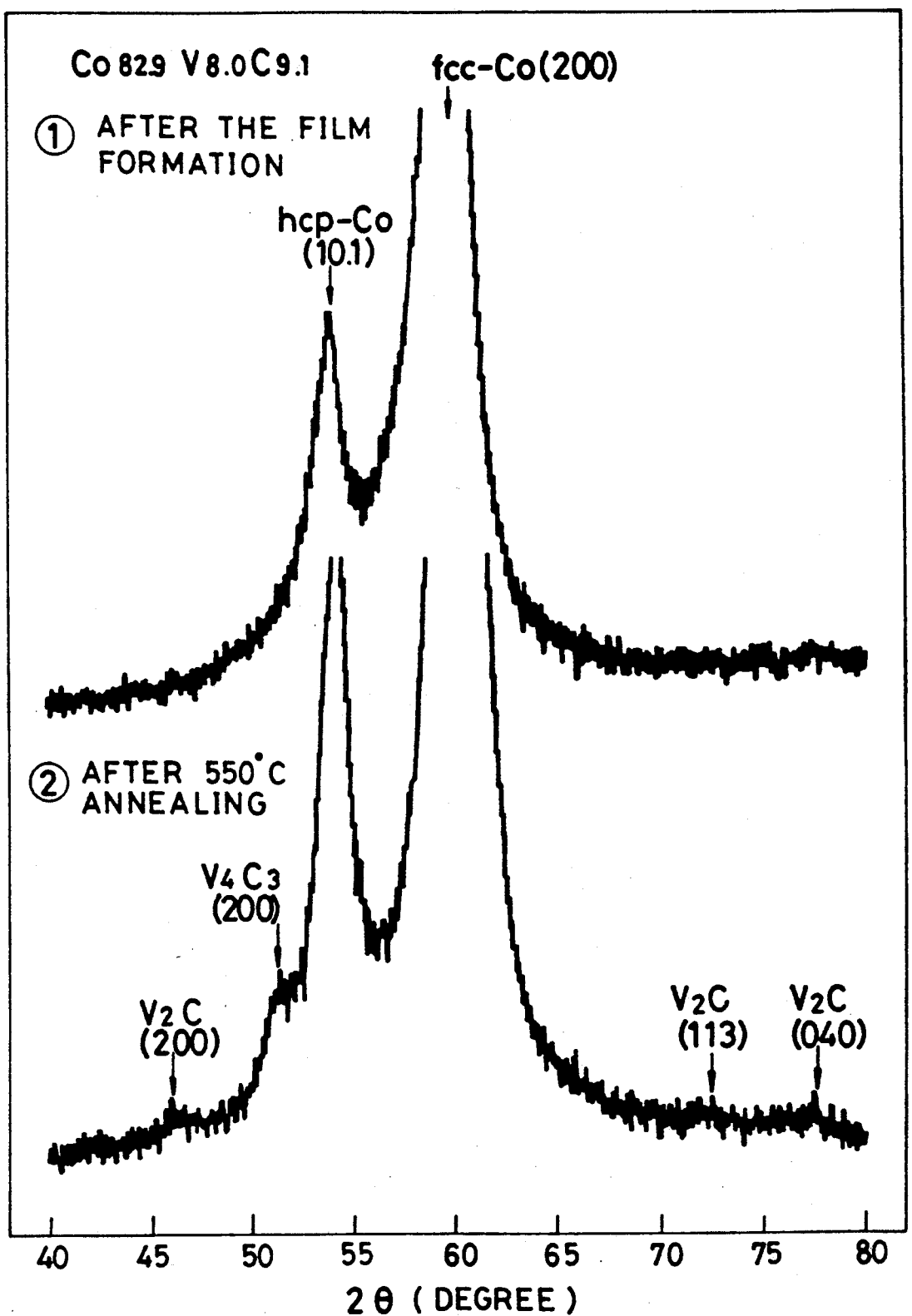
FIG. 4 is a graphic illustration showing the X-ray diffraction pattern collected for identifying the metallurgical composition of films prepared according to the first embodiment.

Pattern (1) in FIG. 4 has only 2 very broad diffration peaks, one each produced by fine crystalline particles of hcp-Co and fcc-Co. (The saturated flux density of the sample in this state will be smaller than the value shown in Table 2.)

Pattern (2) in FIG. 4 shows two peaks for the two states of fine Co crystals as well as peaks revealing the existence of fine crystals of carbides such as $V_4C_3$. Calculations based on the peak width at half height of the Co diffraction peaks of pattern (2), indicate that the average diameter of the crystalline particles of this sample film was very small, between 60–70Å. The fact that the Co crystals did not grow substantially after heat treatment at high temperatures indicates that fine crystalline particles of thermally stable carbides of V are evenly distributed within the film and prevent growth of crystalline particles of Co. When the crystalline particles of Co remain very small in an alloy film, the crystal magnetic anisotropy of Co will be evenly maintained in the film without causing any significant magnetic anisotropy dispersion, and consequently desirably soft magnetic characteristics of the film will be obtained.

Magnetic Head Samples

Figure 5:
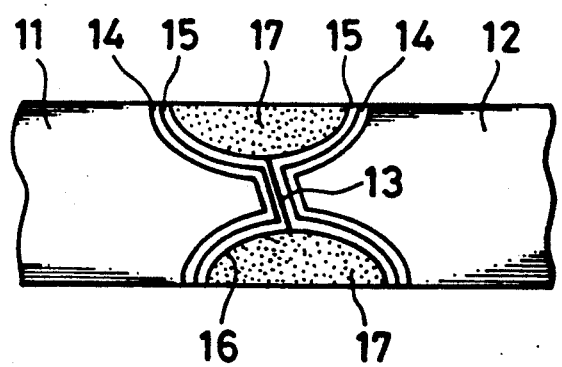
Figure 6:
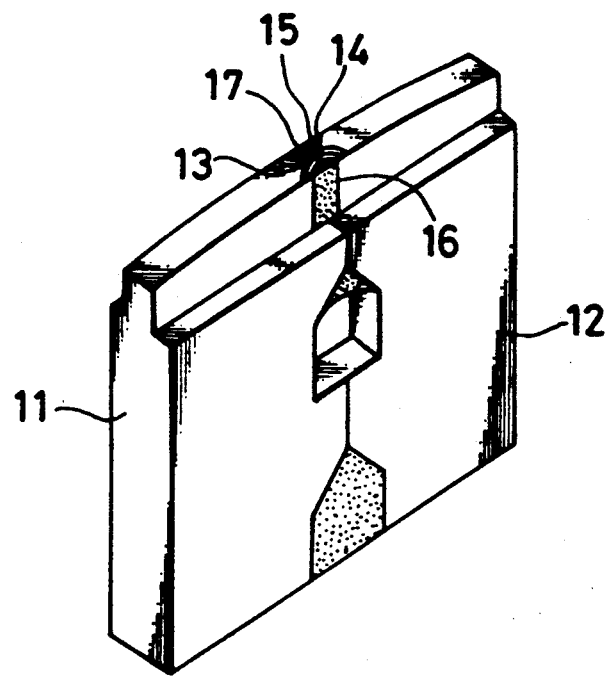

FIGS. 5 and 6 show a magnetic head realized by using an alloy film according to this invention. The magnetic head comprises a pair of of magnetic core halves 11 and 12 which are made of a ferrite material such as Mn-Zn ferrite and joined together with a gap section 13 provided therebetween.

On each of the core halves 11 and 12, there are laminarly provided near the core center a soft magnetic alloy film 14 having a composition expressed by the formula $Co_xM_zC_w$ as described in the first and second embodiments. A noncrystalline soft magnetic alloy film 15 having the composition expressed by the formula $Co_xM_z$ is provided near to the gap 13. M and x and z are defined above. The gap section 13 is formed by inserting a gap spacer principally made of $SiO_2$ between the noncrystalline soft magnetic alloy films 15. The magnetic core halves 11 and 12 which are glass bonded with a gap section and grooves 16 remaining therebetween, grooves 16 being filled by bonding agent 17.

The atomic percentages of the soft magnetic alloy film 14 are defined according to the first and second embodiments for reasons described above. Although a crystalline texture and an amorphous substance are mixed together during sputtering, heat treatment may cause complete conversion to a crystalline texture. However, it is also possible for the texture to be partially or completely amorphous, therefore, both embodiments can be used.

Now a method of forming magnetic core halves 11 and 12, each comprising a soft magnetic film 14 and a noncrystalline soft magnetic film 15 laminated on the surface of a core substrate, will be described.

In a sputtering apparatus having more than two gas inlet systems that can be independently controlled, a Co-Ta-Hf-C film is initially formed by sputtering in a mixed gas of Ar and $CH_4$ using a Co-Ta-Hf alloy target until the film grows to between 50 and 2000Å thick. Next a Co-Ta-Hf film having a thickness of several $\mu$m is formed in pure Ar gas until the aggregate acquires a predetermined thickness.

Since M (Ta, Hf, etc.) is chemically combined with C and exists in the form of carbide MC in the soft magnetic film 14 of the magnetic head having the configuration described above, the affinity between the soft magnetic film 14 and oxygen is reduced. Therefore, any diffusion of oxygen into the side of soft magnetic film 14 as well as into the side of noncrystalline soft magnetic film 15 from the magnetic core halves 11 and 12, and hence formation of pseudo-gaps, will be blocked during glass bonding.

Moreover, since the metal texture of the soft magnetic film 14 consists of fine crystalline particles, the soft magnetism of the magnetic head will not be significantly affected by the magnetic anisotropy of the crystals and will maintain its characteristics for a prolonged period of time.

The advantages produced by the inclusion of fine crystalline particles of MC in a soft magnetic film like 14 are discussed above.

It should be noted that the use of a sputtering apparatus having more than one gas inlet channel is advantageous because it can be applied to preparation of a soft magnetic film 14 and, by simply blocking one of the $CH_4$ gas channels, it can also be applied to preparation of noncrystalline soft magnetic film 15 and conventional films.

Using a high frequency bipolar sputtering apparatus, a film was formed by sputtering a material having the composition $Co_{78.1}Ta_{9.0}Hf_{4.6}C_{8.3}$ on the surface of a core substrate assembly of Mn-Zn ferrite in a gas mixture of Ar and $CH_4$ until the film thickness was 300Å, and subsequently in pure Ar gas until the film thickness reached 5 $\mu$m. Then the obtained magnetic core halves were assembled and bonded together by glass bonding. A gap section was formed with the unit in order to produce a finished magnetic head.

Figure 7:
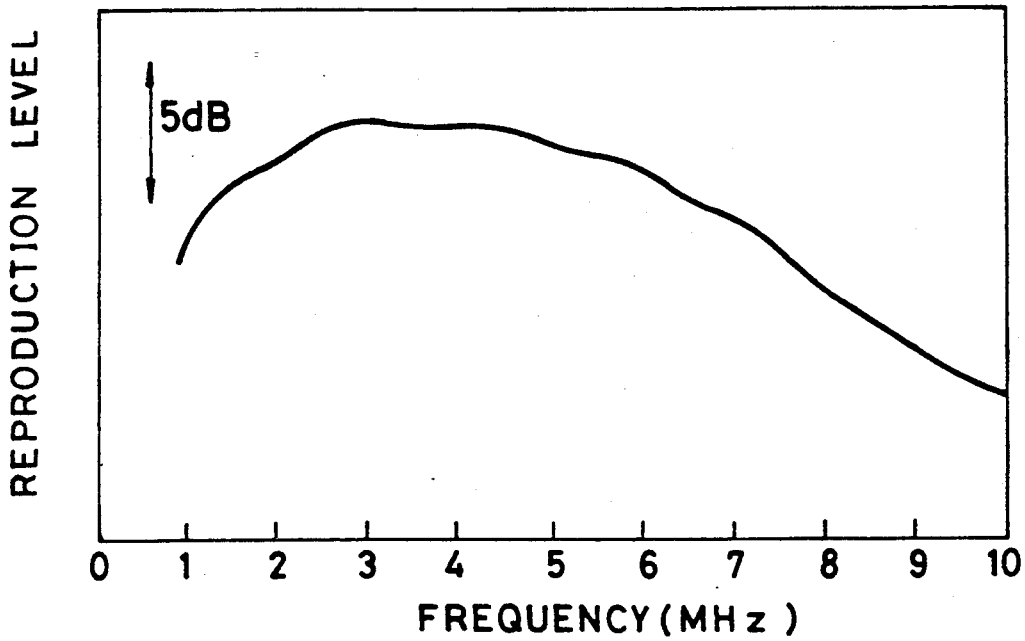
FIG. 7 is a graphic illustration showing the reproduction output level of a magnetic head according to the invention.
Figure 8:
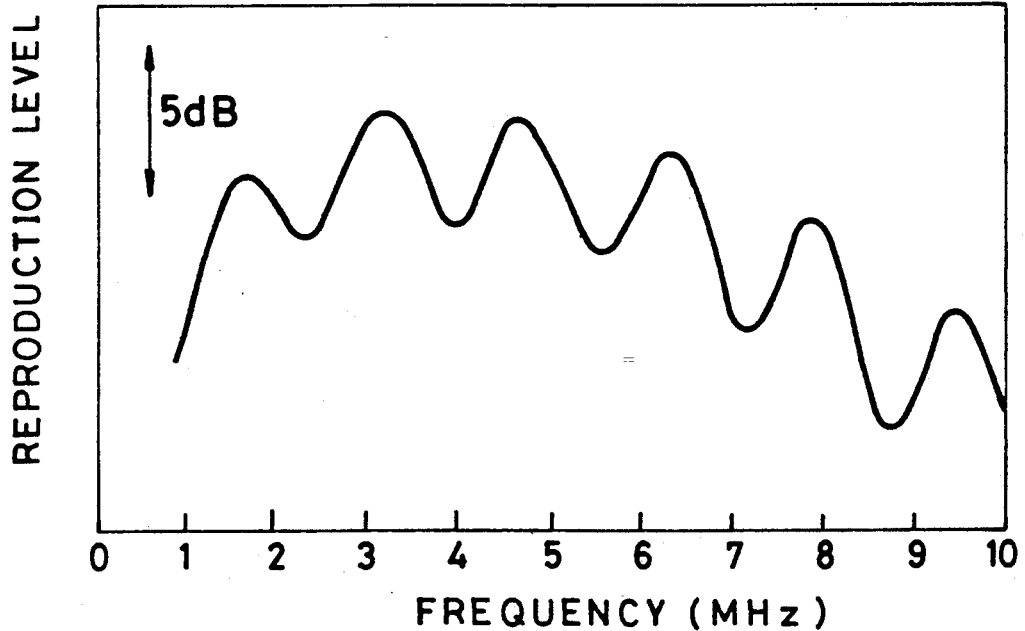
FIG. 8 is a graphic illustration showing the reproduction output level of a conventional magnetic head.

The magnetic head was tested for the frequency characteristics of the reproduction output, which is shown in FIG. 7. For comparison, the frequency characteristics of the reproduction output of a conventional magnetic head using a noncrystalline soft magnetic film having the composition $Co_{84.0}Ta_{10.0}Hf_{6.0}$ is shown in FIG. 8. As seen from FIGS. 7 and 8, the conventional magnetic head presented drops in output level for certain frequencies. Obviously the existence of pseudo-gaps, which interfere with the performance of the main gap, is responsible for the output loses. The level of pseudo-gap noise was between 4–6 dB.

On the other hand, the sample magnetic head prepared according to this invention presented an even and smooth output level throughout the whole frequency range and the level of pseudo-gap noise was less than 0.7dB, evidencing a remarkable improvement in performance.

While this magnetic head sample had a two layered structure comprising a soft magnetic film 14 and a noncrystalline soft magnetic film 15, a magnetic head having only one layer consisting of soft magnetic film 14 may also effectively suppress formation of pseudo-gaps by blocking diffusion of oxygen. It may also show an excellent soft magnetism which can be maintained throughout the process of glass bonding without any substantial growth of crystalline particles.

The soft magnetic film 14 may well be replaced by a soft magnetic film made of an alloy material containing T (Fe, Ni and Mn) for adjustment of the magnetostriction and stabilization of the crystalline structure having a composition of $Co_xT_yM_zC_w$ as described for the third and fourth embodiments. Grounds for choosing the proper ratio of T are described above. A magnetic head comprising a soft magnetic alloy film having this composition and the film 15 is as effective as the sample magnetic head described above and moreover, since the alloy film contains T as an additive, it can obtain a better soft magnetism through better control of the magnetostriction and the crystal structure.

Alternatively, the whole soft magnetic film of a magnetic head may be prepared by using only an alloy material as described for the third embodiment and foregoing use of the film 15.

A soft magnetic alloy film according to this invention principally consists of fine crystalline Co particles and contains only a limited amount of additive elements that can reduce the saturated flux density of the film, making the saturated flux density of the product as high as 16,000G, which is far higher than that of a Sendust alloy film.

Since an alloy film according to the invention contains elements M (Ti, Zr, Hf, Nb, Ta, Mo, V, and W) as well as C which contribute to betterment of the soft magnetism of the product, and the metal texture of the film consists of fine crystalline particles which reduce the adverse effect of the crystal magnetic anisotropy very desirable soft magnetic properties of the film can be realized. Moreover, since the alloy film consists of fine crystalline particles, in which M combines with C to form carbides of M, the crystalline Co particles are prevented from growing even when they are heated above 600° C. during the glass bonding process. Consequently, the excellent soft magnetic characteristics of the product are maintained throughout the process manufacturing the magnetic head, which can therefore meet the requirements of good performance such as high recording density.

By adding T (Fe, Ni and Mn) to control the magnetostriction as well as the crystal texture of the product, the above effects can be further promoted. According to this invention, at least the side of the soft magnetic film close to the core halves of the magnetic head has the composition $Co_xM_zC_w$ or $Co_xT_yM_zC_w$ and metallurgically consists of a texture of fine crystalline particles with an average diameter of less than 0.05 μm. Diffusion of oxygen from the side of the magnetic core halves to the side of the soft magnetic film is blocked during glass bonding. Consequently, formation of pseudo-gaps will be supppressed, thereby remarkably reducing the noise level that can be caused by such pseudo-gaps.

I claim:

1. A soft magnetic alloy film having a composition expressed by general formula $Co_xM_zC_w$, wherein:
   M represents at least one metal element from the group consisting of Ti, Zr, Hf Nb, Ta, Mo, V and W; and
   x, w and z represent ratios of the respective elements in terms of atom % and satisfy $55 \leq x \leq 96$ $2 \leq z \leq 25$, $0.1 \leq w \leq 25$ and $x + z + w = 100$;

said soft magnetic alloy film having crystalline particles with an average diameter of less than 0.05 μm; and
   said alloy partially containing crystalline carbides of element M.

2. A soft magnetic alloy film having a composition expressed by general formula $Co_xT_yM_zC_w$, wherein:
   T represents at least one metal element from the group consisting of Fe, Ni, and Mn,
   M represents at least one metal element from the group consisting of Ti, Zr, Hf, Nb, Ta, Mo, V and W, and
   x, y, z and w represent ratios of the respective elements in terms of atom % and satisfy $50 \leq x \leq 96$ $0.1 \leq y \leq 20$, $2 \leq z \leq 25$,

TABLE 1

| Sample | Composition of Film | Saturated Flux Density Bs(G) | Magnetic Permeability after a Heat Treatment μ(5 MHz) | Coercive Force after a Heat Treatment Hc(Oe) | Magnetostriction λs |
|---|---|---|---|---|---|
| Present Invention | | | | | |
| $A_1$ | $Co_{79.8}Ta_{7.3}Hf_{5.0}C_{7.9}$ | 11900 | 1500 | 0.38 | $-5.5 \times 10^{-6}$ |
| $B_1$ | $Co_{75.7}Fe_{3.8}Ta_{7.6}Hf_{4.9}C_{8.0}$ | 12300 | 1500 | 0.33 | $+1.1 \times 10^{-6}$ |
| $C_1$ | $Co_{82.7}Fe_{5.6}Ta_{4.8}C_{7.0}$ | 15600 | 1000 | 0.65 | $+4.0 \times 10^{-6}$ |
| Example of Sample | | | | | |
| D | $Fe_{73.7}Si_{16.6}Al_{8.7}$ (Film of Sendust) | 10000 | 1500 | 0.40 | $+1.0 \times 10^{-6}$ |

TABLE 2

| Sample | Composition of Film | Saturated Flux Density Bs(G) | Magnetic Permeability after a Heat Treatment μ(5 MHz) | Coercive Force after a Heat Treatment Hc(Oe) | Magnetostriction λs |
|---|---|---|---|---|---|
| Present Invention | | | | | |
| $A_2$ | $Co_{82.9}V_{6.0}C_{9.1}$ | 13500 | 500 | 2.5 | $+5.8 \times 10^{-6}$ |
| $B_2$ | $Co_{78.6}V_{8.5}Nb_{8.5}C_{8.0}$ | 13300 | 1500 | 0.35 | $-3.5 \times 10^{-6}$ |
| $C_2$ | $Co_{74.8}Fe_{4.1}V_{6.8}Nb_{8.4}C_{8.1}$ | 13600 | 1600 | 0.30 | $+0.4 \times 10^{-6}$ |
| Example of Sample | | | | | |
| D | $Fe_{73.7}Si_{16.6}Al_{8.7}$ (Film of Sendust) | 10000 | 1500 | 0.40 | $+1.0 \times 10^{-6}$ |

$0.1 \leq w \leq 25$, $x+y+z+w=100$;

said soft magnetic alloy film having crystalline particles with an average diameter of less than 0.005 μm; and said alloy partially containing crystalline carbides of element M.

* * * * *

UNITED STATES PATENT AND TRADEMARK OFFICE
CERTIFICATE OF CORRECTION

PATENT NO.   : 5,164,025
DATED        : November 17, 1992
INVENTOR(S)  : Hasegawa It is certified that error appears in the above-identified patent and that said Letters Patent is hereby corrected as shown below:

Col. 14 line 1:

Delete "0.005" and insert --0.05-- .

Signed and Sealed this

Twenty-sixth Day of October, 1993

Attest:

BRUCE LEHMAN

Attesting Officer    Commissioner of Patents and Trademarks